US007279809B2

(12) United States Patent
Janning

(10) Patent No.: US 7,279,809 B2
(45) Date of Patent: Oct. 9, 2007

(54) CHRISTMAS LIGHT STRING WITH SINGLE ZENER SHUNTS

(75) Inventor: John L. Janning, Dayton, OH (US)

(73) Assignee: JLJ, Inc., Dayton, OH (US)

( * ) Notice: Subject to any disclaimer, the term of this patent is extended or adjusted under 35 U.S.C. 154(b) by 0 days.

(21) Appl. No.: 11/283,945

(22) Filed: Nov. 22, 2005

(65) Prior Publication Data

US 2006/0082223 A1 Apr. 20, 2006

Related U.S. Application Data

(60) Continuation-in-part of application No. 10/891,094, filed on Jul. 15, 2004, now Pat. No. 7,042,116, which is a continuation of application No. 10/364,526, filed on Feb. 12, 2003, now Pat. No. 6,765,313, which is a continuation of application No. 10/061,223, filed on Feb. 4, 2002, now Pat. No. 6,580,182, which is a continuation of application No. 09/526,519, filed on Mar. 16, 2000, now abandoned, which is a division of application No. 08/896,278, filed on Jul. 7, 1997, now abandoned, which is a continuation of application No. 08/653,979, filed on May 28, 1996, now abandoned, which is a continuation-in-part of application No. 08/560,472, filed on Nov. 17, 1995, now abandoned, which is a continuation-in-part of application No. 08/494,725, filed on Jun. 26, 1995, now abandoned.

(51) Int. Cl.
*H02J 1/00* (2006.01)

(52) U.S. Cl. ....................... 307/36; 307/37; 315/185 S; 315/185 R; 315/122

(58) Field of Classification Search ................ 315/291, 315/185 R, 122, 241 R; 307/36
See application file for complete search history.

(56) References Cited

U.S. PATENT DOCUMENTS 1,024,495 A 4/1912 Booth (Continued)

FOREIGN PATENT DOCUMENTS

CH 427021 12/1966

(Continued)

OTHER PUBLICATIONS

Buchsbaum, Walter, H. "Buchsbaum's Complete handbook of Practical Electronic Reference Data, Copyright 1978, 1973. pp. 182-186, Fig. 8-6 entitled "Zener diode characteristics"."

*Primary Examiner*—Tho Phan
*Assistant Examiner*—Chuc Tran
(74) *Attorney, Agent, or Firm*—Dickstein Shapiro LLP

(57) ABSTRACT

A string set of series-connected incandescent bulbs in which substantially all of the bulb filaments in the set are individually provided with a shunt circuit which includes a voltage responsive switch which is inoperative during normal operation of the string set when connected to a source of operating potential and which becomes operative only in response to an increase in the voltage thereacross which exceeds its rating, and in which the remaining bulbs of the circuit continue to receive substantially rated current therethrough and substantially rated voltage thereacross and further continue to be illuminated at substantially constant illumination even though other or substantially all of the other bulbs in the string are either inoperative or are missing from their respective sockets.

2 Claims, 7 Drawing Sheets

U.S. PATENT DOCUMENTS

| | | | | |
|---|---|---|---|---|
| 1,809,673 | A | 6/1931 | Butler | |
| 1,868,689 | A | 7/1932 | Brander | |
| 2,072,337 | A | 3/1937 | Kamm | |
| 2,760,120 | A | 8/1956 | Fisherman | |
| 3,345,482 | A | 10/1967 | Lou | |
| 3,535,585 | A | 10/1970 | Barnum | |
| 3,639,805 | A | 2/1972 | Muench et al. | |
| 3,912,966 | A | 10/1975 | Harnden, Jr. | |
| 4,450,382 | A | 5/1984 | Sawka et al. | |
| 4,631,650 | A | 12/1986 | Ahroni | |
| 4,653,084 | A | 3/1987 | Ahuja | |
| 4,675,575 | A | 6/1987 | Smith et al. | |
| 4,682,079 | A * | 7/1987 | Sanders et al. | 315/186 |
| 4,727,449 | A | 2/1988 | Fleck | |
| 5,006,724 | A | 4/1991 | Liu | |
| 5,111,058 | A | 5/1992 | Martin | |
| 5,243,510 | A | 9/1993 | Chenny, II | |
| RE34,717 | E | 9/1994 | Sanders | |
| 5,379,214 | A | 1/1995 | Arbuckle et al. | |
| 5,453,664 | A | 9/1995 | Harris | |
| 5,550,319 | A * | 8/1996 | Segan et al. | 84/103 |
| 5,777,868 | A | 7/1998 | Gibboney, Jr. | |
| 5,886,423 | A | 3/1999 | Gershen et al. | |
| 6,084,357 | A | 7/2000 | Janning | |
| 6,283,797 | B1 | 9/2001 | Wu | |
| 6,323,597 | B1 | 11/2001 | Janning | |
| 6,344,716 | B1 | 2/2002 | Gibboney, Jr. | |
| 6,373,199 | B1 | 4/2002 | Erhardt et al. | |
| 6,580,182 | B2 | 6/2003 | Janning | |
| 6,672,738 | B1 * | 1/2004 | Lewis et al. | 362/251 |
| 6,765,313 | B2 | 7/2004 | Janning | |
| 2002/0043943 | A1 * | 4/2002 | Menzer et al. | 315/291 |

FOREIGN PATENT DOCUMENTS

| | | | |
|---|---|---|---|
| DE | 19841490 | A1 | 3/2000 |
| EP | 0 284 592 | | 9/1988 |
| FR | 2 602 115 | | 1/1988 |
| FR | 2 663 183 | | 12/1991 |
| JP | 50-43092 | | 12/1975 |
| JP | 60-88499 | | 6/1985 |

* cited by examiner

CHRISTMAS LIGHT STRING WITH SINGLE ZENER SHUNTS

This is a continuation-in-part of application Ser. No. 10/891,094, filed Jul. 15, 2004, now U.S. Pat. No. 7,042,116 which is a continuation of application Ser. No. 10/364,526, filed Feb. 12, 2003, now U.S. Pat. No. 6,765,313, which is a continuation of application Ser. No. 10/061,223, filed Feb. 4, 2002, now U.S. Pat. No. 6,580,182, which is a continuation of application Ser. No. 09/526,519, filed Mar. 16, 2000, abandoned, which is a division of application Ser. No. 08/896,278 filed Jul. 7, 1997, now abandoned, which is a continuation of application Ser. No. 08/653,979, filed May 28, 1996, now abandoned, which is a continuation-in-part of application Ser. No. 08/560,472, filed Nov. 17, 1995, now abandoned which, in turn, is a continuation-in-part of application Ser. No. 08/494,725, filed Jun. 26, 1995, now abandoned. The disclosures of each of these prior applications are incorporated herein in their entirety.

BACKGROUND OF THE INVENTION

Most Christmas light strings used for decorating on Christmas trees and elsewhere today consist of miniature light bulbs ("mini-lights"). These light bulbs are wired in electrical series connection with typical light strings having 35, 50 or 100 lights. The light strings are normally powered by standard house current of 120 volts, 60 cycle, alternating current (AC).

The mini-lights used in these strings usually have a 'shunt' mechanism in parallel with the filament so that when a filament burns out, the shunt is activated due to the increased voltage dropped across it, and the light string continues to operate. This shunt typically consists of several turns of oxidized aluminum wire wrapped around the mini-light's filament electrodes and attached to one of the electrodes. When the filament is broken due to a burnout or other cause, the full 120 volts AC—or peak voltage of approximately 170 volts—appears across the filament electrodes. Since one of the shunt leads is connected to one of the filament electrodes, the full voltage now exists between the other filament electrode and the thin oxidized layer on the shunt wire. The breakdown of this oxidized layer occurs at a minimum of 40 volts. Since the actual voltage can rise to approximately 170 volts, breakdown usually—but not always—occurs. The series-wired light string continues to operate but with a higher voltage dropped across each mini-light, thus, shortening bulb life.

U.S. Pat. No. 4,450,382 utilizes a Zener diode connected in parallel with each series connected direct-current lamp used by trucks and other vehicles, particularly military trailers, for burn-out protection for the remaining bulbs whenever one or more bulbs burns out for some reason. It is stated therein that the use of either a single or a plurality of parallel connected Zener diodes will not protect the lamps against normal failure caused by normal current flows, but will protect against failures due to excessive current surges associated with the failure of associated lamps. No suggestion appears therein of any mechanism or technique which would provide a solution to the problem successfully achieved by applicant in a very simple and economical manner.

U.S. Pat. No. 4,682,079 discloses an electrical circuit that includes a full bridge rectifier and Zener diodes connected to insure continuous energization of lamps of the string while protecting against excessive voltages and minimizing safety hazards. However, the operation of this ornament circuitry requires a much higher voltage than the 2.5 volts designed for a typical 50-light series wired string operating at 120 volts AC. Indeed, the voltage drop across each light bulb is about 9 volts AC, so if this circuit was used in a 50-light string, only a fraction of the light bulbs could be shunted (or there would be insufficient voltage to operate the full string), and the rating of the shunted bulbs would necessarily have to be different from the other bulbs in the string.

Various other attempts have heretofore been made to provide various types of shunts in parallel with the filament of each bulb, whereby the string will continue to be illuminated whenever a bulb has burned out, or otherwise provides an open circuit condition. Typical of such arrangements are found in U.S. Pat. Nos. RE 34,717; 1,024,495; 2,072,337; 2,760,120; 3,639,805; 3,912,966; 4,450,382; 4,682,079; 4,727,449; 5,379,214; and 5,006,724, together with Swiss patent 427,021.

Of the foregoing prior art patents, the Fleck '449, Harnden '966, and the Swiss '021 patents appear, at first blush, to probably be the most promising in the prior art in indicating defective bulbs in a string by the use of filament shunt circuits and/or devices of various types which range from polycrystalline materials, to powders, and to metal oxide varistors, and the like, which provide for continued current flow through the string, but at either a higher or a lower level. The reason for this is because of the fact that the voltage drop occurring across each prior art shunt is substantially different value than the value of the voltage drop across the incandescent bulb during normal operation thereof. Some of these prior art shunts cause a reduced current flow in the series string because of too high of a voltage drop occurring across the shunt when a bulb becomes inoperable, either due to an open filament, a faulty bulb, a faulty socket, or simply because the bulb is not mounted properly in the socket, or is entirely removed or falls from its respective socket. However, other shunt devices cause the opposite effect due to an undesired increase in current flow. For example, when the voltage dropped across a socket decreases, then a higher voltage is applied to all of the remaining bulbs in the string, which higher voltage results in higher current flow and a decreased life expectancy of the remaining bulbs in the string. Additionally, such higher voltage also results in increased light output from each of the remaining bulbs in the string, which may not be desirable in some instances. However, when the voltage dropped across a socket increases, then a lower voltage is applied to all of the remaining bulbs in the series connected string, which results in lesser current flow and a corresponding decrease in light output from each of the remaining bulbs in the string. Such undesirable effect occurs in all of the prior art attempts, including those which, at first blush, might be considered the most promising techniques, especially the proposed use of a diode in series with a bilateral switch in the Fleck '449 patent, or the proposed use of a metal oxide varistor in the above Harnden '966 patent, or the use of the proposed counter-connected rectifiers in the Swiss '021 patent.

For example, in the arrangement suggested in the above Fleck '449 patent, ten halogen filled bulbs, each having a minimum 12-volt operating rating, are utilized in a series circuit. The existence of a halogen gas in the envelope, permits higher value current flow through the filament with the result that much brighter light is obtainable in a very small bulb size. Normally, when ten 12-volt halogen bulbs are connected in a series string, the whole string goes dark whenever a single bulb fails and does not indicate which bulb had failed. To remedy this undesirable effect, Fleck provided a bypass circuit across each halogen filled bulb which comprised a silicon bilateral voltage triggered switch in series with a diode which rectifies the alternating current (i.e., "A.C.") supply voltage and thereby permits current to flow through the bilateral switch only half of the time, i.e., only during each half cycle of the A. C. supply voltage. It is stated in Fleck that when a single bulb burns out, the remaining bulbs will have “diminished” light output because the diode will almost halve the effective voltage due to its blocking flow in one direction and conduction flow only in the opposite direction. Such substantially diminished light output will quite obviously call attention to the failed bulb, as well as avoid the application of a greater voltage which would decrease the life of the remaining filaments. However, in actual practice, a drastic drop in brightness has been observed, i.e. a drop from approximately 314 lux to approximately 15 lux when one bulb goes out. Additionally, it is stated by the patentee that the foregoing procedure of replacing a burned out bulb involves the interruption of the application of the voltage source in order to allow the switch to open and to resume normal operation after the bulb has been replaced. (See column 2, lines 19-22.) Additionally, as such an arrangement does not permit more that one bulb to be out at the same time, certain additional desirable special effects such as “twinkling”, and the like, obviously would not be possible.

In the arrangement suggested in Harnden ’966 patent, Harden proposes to utilize a polycrystalline metal oxide varistor as the shunting device, notwithstanding the fact that it is well known that metal oxide varistors are not designed to handle continuous current flow therethrough. Consequently, they are merely a so-called “one shot” device for protective purposes, i.e. a transient voltage suppressor that is intended to absorb high frequency or rapid voltage spikes and thereby preventing such voltage spikes from doing damage to associated circuitry. They are designed for use as spike absorbers and are not designed to function as a voltage regulator or as a steady state current dissipation circuit. While metal oxide varistors may appear in some cases similar to back-to-back Zener diodes, they are not interchangeable and function very differently according to their particular use. In fact, the assignee of the Harnden ’966 patent which was formerly General Electric Corporation and now is apparently Harris Semiconductor, Inc., states in their Application Note 9311: “They are exceptional at dissipating transient voltage spikes but they cannot dissipate continuous low level power.” In fact, they further state that their metal oxide varistors cannot be used as a voltage regulator as their function is to be used as a nonlinear impedance device. The only similarity that one can draw from metal oxide varistors and back-to-back Zener diodes is that they are both bi-directional; after that, the similarity ends.

In the Swiss ’021 patent, Dyre discloses a bilateral shunt device having a breakdown voltage rating that, when exceeded, lowers the resistance thereof to 1 ohm or less. This low value of resistance results in a substantial increase in the voltage being applied to the remaining bulbs even when only a single bulb is inoperative for any of the reasons previously stated. Thus, when multiple bulbs are inoperative, a still greater voltage is applied to the remaining bulbs, thereby again substantially increasing their illumination, and consequently, substantially shortening their life expectancy.

In contrast, by utilizing a shunt of the type proposed by Applicant, substantially all of the bulbs in a 50 bulb string can become inoperative for any or all of the reasons previously stated, with only a minimal decrease in intensity of illumination of the remaining bulbs, which is not possible with any of the foregoing shunts. Additionally, and of particular significance, is the fact that the Swiss ’021 teaching has now been available to those skilled in the art for over 30 years, that the Harnden ’966 has additionally been available for over 20 years, and, the Fleck ’449 teaching has still additional been available for over 8 years, and yet none of such teachings, either singly of collectively, have found their way to commercial application. In fact, as mentioned above, miniature Christmas tree types lights now rely solely upon a specially designed bulb which is supposed to short out when becoming inoperative. Obviously, such a scheme is not always effective, particularly when a bulb is removed from its socket or becomes damaged in handling, etc. The extent of the extreme attempts made by others to absolutely keep the bulbs from falling from their sockets, includes the use of a locking groove formed on the inside circumference of the socket mating with a corresponding raised ridge formed on the base of the bulb base unit. While this particular locking technique apparently is very effective to keep bulbs from falling from their respective sockets, the replacement of defective bulbs by the average user is extremely difficult, if not sometimes impossible, without resorting to mechanical gripping devices which can actually destroy the bulb base unit or socket.

SUMMARY OF THE INVENTION

In accordance with the present invention, there is provided a novel filament shunting circuit for use in connection with a series connected string of incandescent light bulbs which completely overcomes in a very simple, novel and economical manner the problems heretofore associated with prior arrangements which were primarily designed to merely maintain some sort of current flow through the entire string of bulbs whenever one or more bulbs in the string becomes inoperable, either due to an open filament, one or more faulty bulbs, one or more faulty sockets, or simply because one or more of the bulbs are not properly mounted in their respective sockets, or are entirely removed or fall from their respective sockets.

In accordance with the present invention, there is provided a series string of incandescent light bulbs, each having a silicon type shunting device connected thereacross which has a predetermined voltage switching value which is greater than the voltage normally applied to said bulbs, and which shunt becomes fully conductive only when the peak voltage applied to said bulbs, and which shunt becomes fully conductive only when the peak voltage applied thereacross exceeds its said predetermined voltage switching value, which occurs whenever a bulb in the string either becomes inoperable due to any one or more or all of the following reasons: an open filament, faulty or damaged bulb, faulty socket, or simply because the bulb is not properly mounted in its respective socket, or is entirely removed or falls from its respective socket, and which circuit arrangement provides for the continued flow of rated current through all of the remaining bulbs in the string, together with substantially unchanged illumination in light output from any of those remaining operative in the string even though a substantial number of total bulbs in the string are simultaneously inoperative for any combinations of the various reasons heretofore stated.

It is therefore a principal object of the present invention to provide a simple and inexpensive silicon type filament shunt, or bypass, for each of a plurality of series connected light bulbs, said filament shunt having a predetermined conductive switching value which is only slightly greater than the voltage rating of said bulbs, and which shunt becomes conductive whenever the peak voltage applied thereacross exceeds its said predetermined voltage switching value, which would occur for any of the reasons previously stated, and which provides continued and uninterrupted flow of rated current through each of the remaining bulbs in the string, together with substantially unchanged illumination in light output therefrom.

It is another object of the present invention to provide a new and improved series-connected light bulb string which has the desirable features set forth above, and yet is of very simple and economical construction and is relatively inexpensive to manufacture in mass quantities, thereby keeping the overall cost of the final product on the marketplace at a minimum, and which does not necessitate any type of bulb which is specially designed to provide a short circuit whenever it burns out, as is presently the case in substantially all strings on the market.

It is still another object of the present invention to provide a series-connected light bulb string having all of the features set forth above, and in which the light emitted from each light bulb will optionally appear, disappear, and reappear independently and continuously along the entire string, thereby creating a most striking, novel and unusual twinkling effect.

DETAILED DESCRIPTION OF THE PREFERRED EMBODIMENTS

Figure 1:
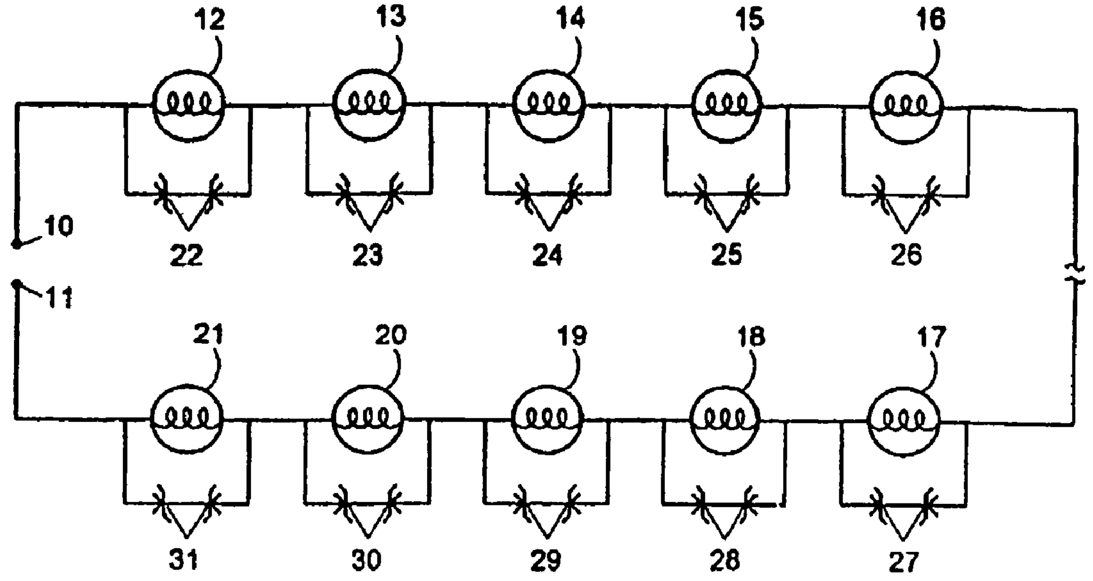
FIG. 1 is an electrical schematic diagram of a novel light string constructed in accordance with a first embodiment of the present invention.

With reference to the schematic diagram in FIG. 1, the novel light string constructed in accordance with the first embodiment of the present invention comprises input terminals 10 and 11 which are adapted to be connected to a suitable source of supply of 110/120 volts of alternating current normally found in a typical household or business. Terminal 10 is normally fixedly connected to the first terminal of the first socket having a first electrical light bulb 12 operatively plugged therein. The adjacent terminal of the first socket is electrically connected to the adjacent terminal of the second socket having a second light bulb 13 operatively plugged therein, and so on, until each of the light bulbs in the entire string (whether a total of 10 bulbs, as diagrammatically shown, or a total of 50 as is typically the case) are finally operatively connected in an electrical series circuit between input terminals 10 and 11. Operatively connected in an electrical parallel across the electrical terminals of the first socket, hence the electrical terminals of first light bulb 12, is a first voltage sensitive sensitive switch 22 which is symbolically illustrated and which effectively functions as a first voltage regulating device in the manner hereinafter described. Likewise, operatively connected in electrical parallel across the electrical terminals of the second socket, hence second light bulb 13, is a second voltage sensitive switch 23 which likewise effectively functions as a voltage regulating device, and so on, until each of the remaining sockets, and hence each of remaining light bulb 14 through 21 of the series has a corresponding one of voltage sensitive switches 24 through 31 operatively connected in parallel thereacross.

For practical purposes, it is preferred that all voltage responsive switches 22 through 31 be of identical construction and ideally would have a characteristic, such that, when conductive, i.e. in an "on" or "closed" condition, the impedance thereof have a value equal to the impedance of the filament of the corresponding light bulb and, when nonconductive, i.e. in an "of" or "open" condition, the value of the impedance thereof would be equal to infinity.

It has been found that, when two well-known semiconductive devices known as "Zener" diodes are connected back-to-back (i.e. in an inverse electrical series connection), they provide the desirable characteristics for an excellent voltage responsive switch which essentially functions as a voltage regulating device in accordance with the present invention, particularly since such back-to-back Zener diodes are readily available in the market place at relatively low cost, and more particularly when purchased in relatively large quantities. The mode of operation of the embodiment of FIG. 1 is as follows:

Assuming the light string is a typical 50 light string containing 50 lamps connected in electrical series, and with each lamp having a voltage rating of 2.4 volts. the effective voltage rating for the entire string would be determined by multiplying 50 times 2.4 volts, which resultant product equals 120 volts. By electrically connecting two Zener diodes in a back-to-back inverse-series connection, with each having a voltage rating of 3.3 volts, across each lamp (which Zener diodes may both be constructed within the socket itself), the voltage across each individual lamp, with 200 milliamperes of current flow, cannot increase beyond approximately 4.5 volts. When a lamp is illuminated (or "on") in the string, the voltage across that particular lamp is approximately 2.4 volts (or approximately 3.4 volts, peak value), depending, of course, on the value of the applied line voltage at that particular time. With two Zener diodes, each having a voltage rating of 3.3 volts connected in a back-to-back configuration across each lamp, substantially no current flows through either of the Zener diodes, and substantially all of the current flows through each series connected lamp. When a lamp is removed from its respective socket or burns out, or the like, and there is no shorting mechanism within the lamp, the voltage across that particular lamp begins to rise toward the value of the applied line voltage. However, with the two 3.3 volt Zener diodes connected back-to-back across that particular lamp, the voltage thereacross can only rise to approximately 4.5 volts before both Zener diodes begin conduction. This is only approximately 1.1 volts (peak) more than was dropped across the respective socket when the corresponding lamp was conducting. The remaining lamps in the string are little affected by the extra 1.1 volt (peak) drop occurring in the Zener circuit. The voltage across each remaining lamp in the string is lowered by a mere approximately 23 millivolts (peak). Thus, substantially no current flows in the shunting mechanism until it is needed.

Figure 5:
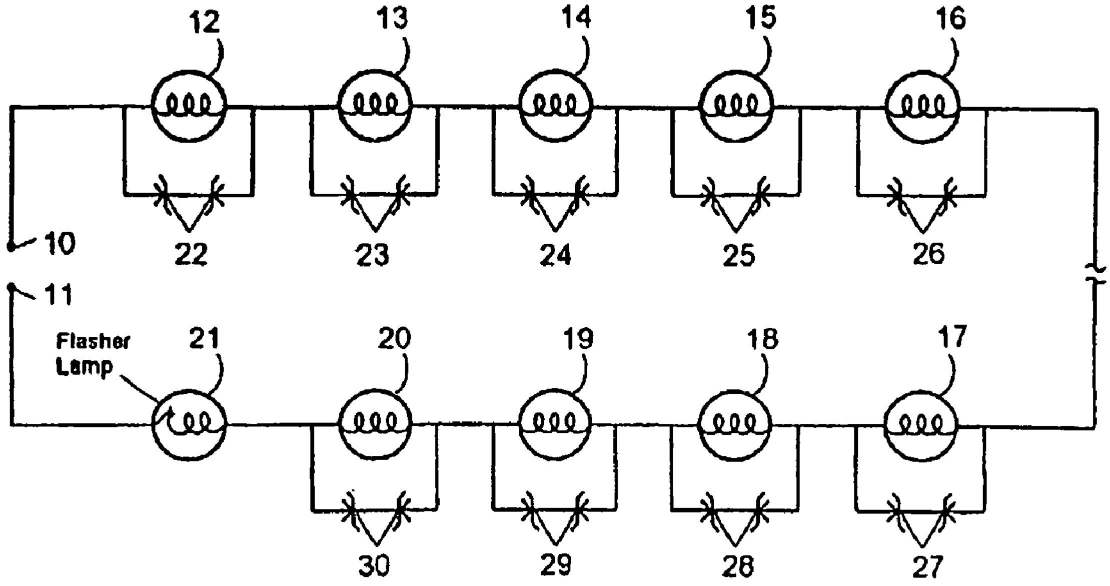
FIG. 5 is an electrical schematic diagram of a novel light string constructed in accordance with still another embodiment of the present invention.

The unusual and desirable characteristics of the foregoing embodiment over prior art light strings is the fact that the string continues to stay lit, regardless of whether one or more of the light bulbs in the string burns out, falls out of their respective sockets, or are loose or are inserted crooked in their respective sockets. The string stays lit no matter what happens to one or more light bulbs in the string. Thus, the back-to-back Zener diodes insure that current will continue to flow in the series-wired circuit, regardless of what happens to the particular light bulb across which it is shunted. However, if it is desired to insert a standard “flasher” bulb in one of the sockets, as is customarily done, whereby the entire light string will go on and off each time the flasher bulb changes state, it is necessary to omit a Zener diode pair from across one of the sockets, preferably one of the sockets nearest the A.C. plug, and then insert the flasher bulb in that particular socket as diagrammatically illustrated in FIG. 5. Thereafter, the string will flash on and off in a normal manner.

It should be recognized and appreciated that, when it was stated above that the voltage rating of each Zener diode is 3.3 volts, this means that the Zener diode will begin conducting in the reverse direction whenever the voltage across that particular Zener diode first reaches 3.3 volts. Conversely, when the Zener diode is conducting in the forward direction, there is an approximately 0.7 volt drop across that particular Zener diode. Thus, when two such Zener diodes are electrically connected in a back-to-back configuration, the effective voltage breakdown rating of the pair (hereinafter “effective voltage rating”) is approximately 4.0 volts (i.e., 3.3 volts plus 0.7 volts) because one Zener diode in a pair is conducting in a forward direction and the other Zener diode in the pair is conducting in the reverse direction. Thus, the pair is polarity symmetrical, i.e., the same in both directions. This 4.0 voltage value will increase as more current flows through the back-to-back pair, until a current flow of approximately 200 milliamperes is flowing therethrough, i.e., the average current in a 50 bulb string, at which time the voltage dropped across the two 3.3 volt rated back-to-back Zener diodes reaches approximately 4.4 volts. Such back-to-back Zener diodes are commercially available from ITT Semiconductor Company as their DZ89 Series “dual Zeners”. Various voltage ratings are available and which ratings are usually expressed in terms of peak voltage values, or sometimes the A.C. rating.

Each back-to-back Zener diode pair, or dual Zeners, is prevented from destroying itself as a result of the well-known “current runaway” condition, due to the current limiting effect by the remaining series connected lamps in the string whose total resistance value determines the magnitude of the current flowing therethrough. If, for example, all of the lamps are removed from the string, the supply voltage of 120 volts (A.C.), or 170 volts (peak) appears across the 50 shunts. With each back-to-back Zener diode shunt effectively rated at 4.0 volts (peak), there is little or no current conduction in the string because only 3.4 volts (peak) is available to appear across each shunt.

Another preferred device is the bilateral silicon trigger switch (STS), HS Series, which is currently available from Teccor Electronics, Inc., a Siebe Company, but is presently slightly more expensive than the back-to-back Zener type switch. Like the back-to-back Zener type switch the so-called “STS, HS Series”, type switches offer low breakover voltages, is mounted in an economical DO-35 package, and with glass passivated junctions for reliability. The “HS” devices switch from the blocking mode to a conduction mode when the applied voltage, of either polarity, exceeds the breakover voltage and are not only bilateral but, like the back-to-back Zener diodes, are also very symmetrical for alternating current applications. As schematically illustrated in FIG. 2, each of the illustrated bilateral silicon trigger switches 22' through 31' is respectively connected in parallel with a corresponding one of series connected light bulbs 12 through 21 in the same manner as previously illustrated in FIG. 1.

Figure 2:
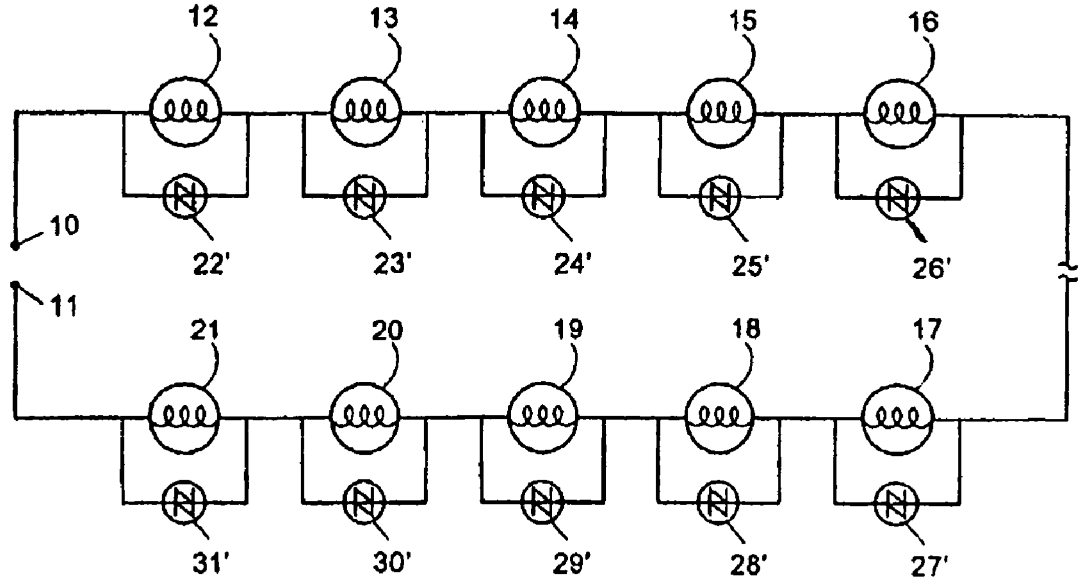
FIG. 2 is electrical schematic diagram of a novel light string constructed in accordance with a further embodiment of the present invention.
Figure 6:
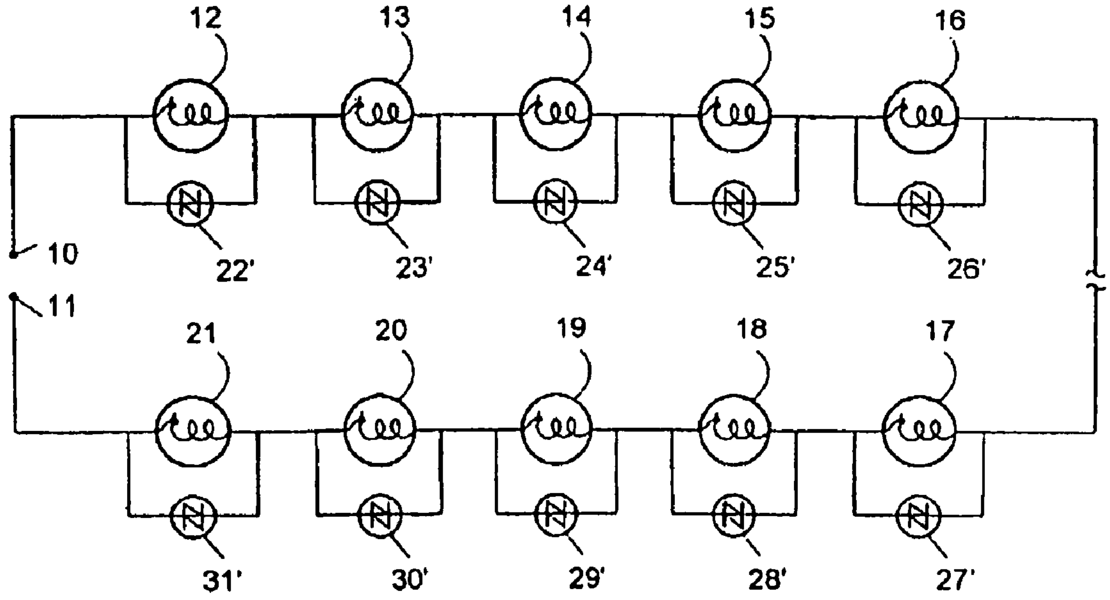
FIG. 6 is an electrical schematic diagram of a novel light string constructed in accordance with still another embodiment of the present invention.

The mode of operation of the silicon trigger switch embodiment shown in FIG. 2 is substantially the same as that of the back-to-back Zener diode embodiment shown in FIG. 1. However, in the STS embodiment utilizing a Teccor Model HS-10 type silicon trigger switch as a shunt rated as triggering at approximately 10 volts, substantially the same voltage drop of approximately 2.4 volts again appear across each light socket of a 50 miniature light string whenever the STS is conductive. When an STS device is shunted across each socket, there is no conduction in the STS device until the corresponding light bulb burns out or is removed from its socket. When that happens, the voltage starts to rise upward until approximately 10 volts is reached, at which time the STS device switches from the “off” to the “on” state. In the “on” state, the voltage across the STS device in a 50 light string at 200 milliamperes, at which most 50 light strings operate, is approximately 2.4 volts, the same as it was when the respective light bulb was in its socket and operative. Thus, the voltage drop across each light bulb remains virtually unchanged, whether or not one or more of the remaining light bulbs in the string are operative. Another advantage of the STS embodiment is that it is not necessary to remove a shunt from one of the sockets in order to obtain either the desired “twinkling” or “twinkle-flash” operation as diagrammatically illustrated in FIG. 6. However, to obtain a standard “flash” operation, whereby the string will flash “on” and “off”, removal of the STS shunt from one of the sockets, preferably one that is closest to the A.C. socket, is necessary.

For example, because of the sharp threshold of the STS shunt, by placing a non-flashing bulb in the first socket (without a STS shunt device), and by placing flasher bulbs in all of the other sockets, the string will twinkle and flash. Flashing of the twinkling string will occur when at least twelve to thirteen bulbs are all simultaneously in an “off” state. This is because the STS devices switch to the conducting state when the voltage across them reach approximately 10 volts. Therefore, in a 120 volt supply line, it will take twelve to thirteen lamps to be in the “off” state before the string goes out. When the flashers return to their normal conducting state, the string comes on again and twinkles until twelve to thirteen bulb s are again simultaneously in an “off” state. The periodicity of this flashing “off” and “on” will be a function of the flasher bulbs. If the flasher bulbs are illuminated most of the time and are only “off” for a short period of time, to have the twelve to thirteen simultaneously “off” will be infrequent and will result in a shorter time period of flashing and in a longer time period of twinkling.

Figure 3:
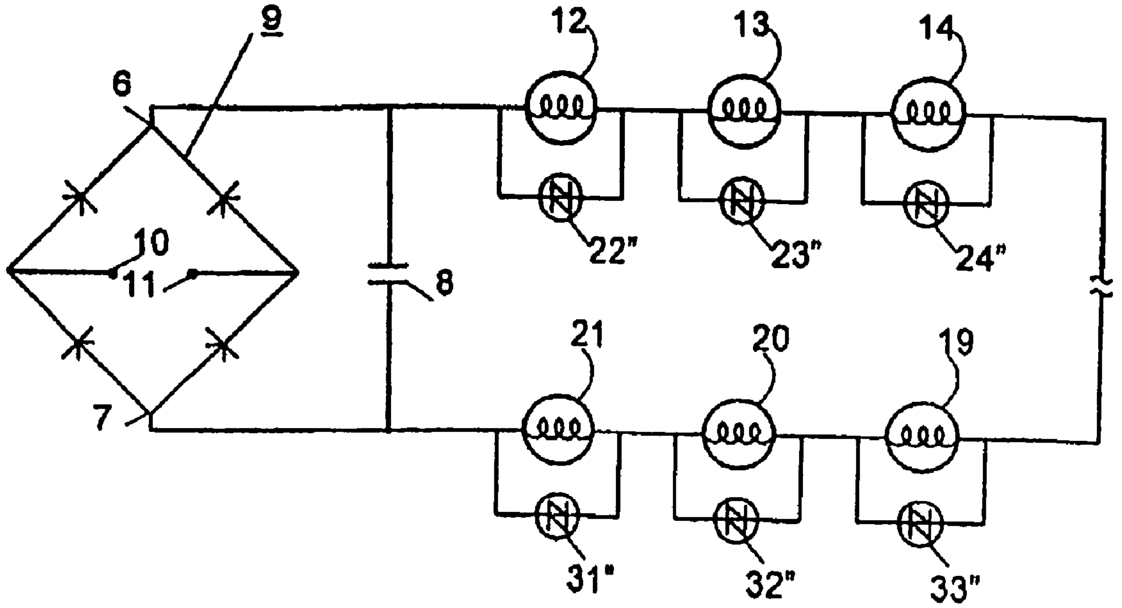
FIG. 3 is an electrical schematic diagram of a novel light string constructed in accordance with still another embodiment of the present invention.

The embodiment shown in FIG. 3, illustrates a circuit arrangement which operates substantially the same as the previous embodiments, with the exception that the source of operating voltage is a fill wave rectified voltage which pulsates at twice the normal 60 cycle rate. As shown in FIG. 3, STS devices 22" through 31" are respectively shunted across light bulbs 12-21, which preferably comprises a 50 miniature bulb string. Preferably molded in the power cord socket is a full wave rectifier 9 which preferably has a 3.9 microfarad capacitor connected across terminals 6 and 7. With this particular circuit arrangement, the light bulbs in a 50 bulb set will only twinkle and will not twinkle-flash as before. As before indicated, the rectifier 9 and capacitor 8 can either be installed inside the A.C. plug or they can be in a separate adapter plug that the power cord plug is plugged into. This will apply pulsating and partially filtered direct current (i.e., “D.C.”) to the string. Direct current is needed to prevent the STS devices from switching “off” during the time a flasher bulb is in the off state, since the voltage never reaches zero volts to turn the device “off”. In A.C. operation, the STS device is triggered “off” and “on” 120 times a second. In the “off” state of the STS device, a voltage of approximately 10 volts is required to turn it on. This is the reason for the limitation on the number of bulbs that can twinkle using an A.C. source of operating potential. However, using D.C. as the operating potential, the STS devices remain conductive until the associated flasher bulb is illuminated. Therefore, there is no limitation on the number of bulbs that can be used in the string. While there is no limitation on the number of bulbs that can twinkle in a string using D.C. voltage as the operating potential, there is another matching consideration which preferably should be addressed. If just a bridge rectifier by itself is used and the pulsating output voltage is not filtered, the string will function the same as if A.C. were used as the operating potential. This is because the STS device will go “off” and “on” 120 times a second, i.e., two times the A.C. rate. By installing a capacitor across the output of the bridge rectifier, there will be an improvement in performance. However, if capacitor 8 is too small, the lamp intensity will flicker, especially if flasher bulbs are mixed with regular bulbs in the string. Additionally, the current in the string will be too low. If too large of a capacitor is used, the current through the bulbs will be excessive and bulb life will be shortened. Therefore, the ideal capacitance is one where the current through the lamps is the normal 200 milliamperes in a typical 50 miniature light bulb string. At this level, current flow stabilizes and the string operates perfectly. In a 50 miniature bulb string, the preferred capacitance is approximately 3.3 to 4.7 microfarads. If one or more flasher bulbs are now inserted into the string, each flasher bulb will continue to go “on” and “off” at its own independent rate. More capacitance will be needed when more bulbs are added.

Figure 4:
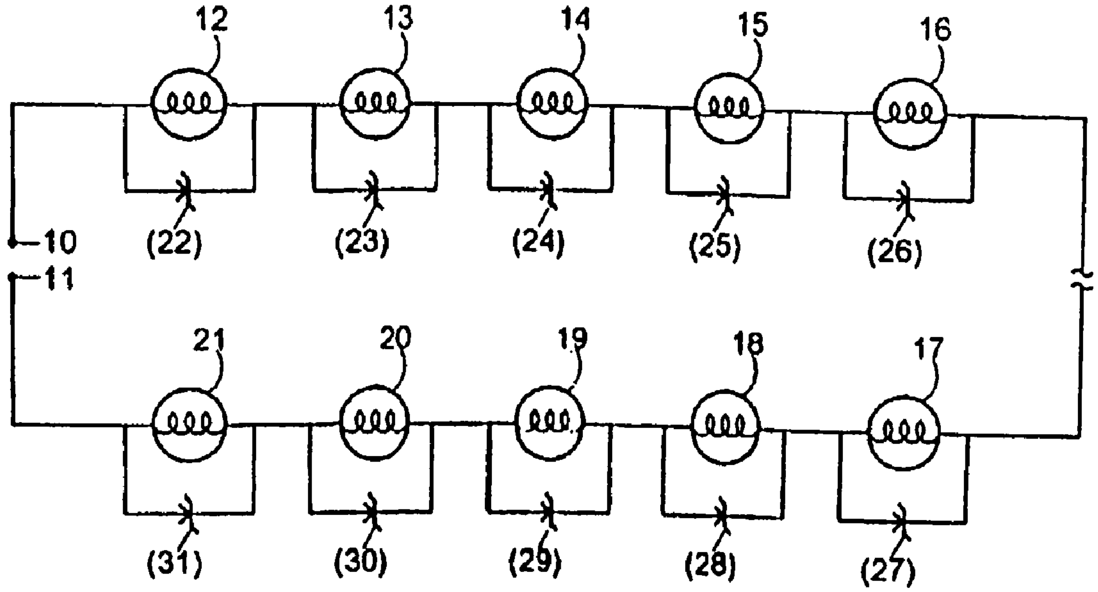
FIG. 4 is an electrical schematic diagram of a novel light string constructed in accordance with still another embodiment of the present invention.

In the further embodiment shown in FIG. 4, there is illustrated a circuit arrangement which operates substantially the same as the previously described embodiments, with the exception that only a single Zener diode is shunted across each bulb socket and that preferably one-half of the total number of Zener diodes in the circuit are functionally oriented in one predetermined direction, as illustrated by light bulbs 12 through 16, while the remaining half are functionally oriented in the opposite direction, as illustrated by light bulbs 17 through 21.

For illustrative purposes only, assuming the circuit shown in FIG. 4 (as in FIGS. 1-3) contains a total of 50 series-connected incandescent bulbs, only 10 of which are shown for illustrative purposes as 12 through 21, and that the incoming operating potential of approximately 120 volts rms A.C. which corresponds to a peak voltage of approximately 170 volts A.C. In this case, each bulb receives an average rms voltage of approximately 2.4 volts, or approximately 3.4 peak volts, if all of the bulbs are of the same rating, which is normally the case. With a 6.2 volt Zener diode shunted across each of the bulbs, with the first 25 shunts, represented by (22) through (26), having their respective polarities connected in one direction, as shown, and the remaining 25 shunts, represented as (27) through (31), having their respective polarities connected in the opposite direction, as shown, the average voltage drop across each bulb is approximately 120 divided by 50, or approximately 2.4 volts rms or 3.4 peak volts. This is because during one-half of the A.C. cycle of the input supply voltage, the first 25 shunts will be forward biased and approximately 0.7-0.8 peak volts will appear across each shunt for a total of approximately 17.5-20 volts peak dropped across the first 25 shunts. Bulbs placed in these particular sockets will each receive a voltage of approximately 0.7-0.8 peak volts during the first half cycle of the operating potential, thereby resulting in a momentary tendency to decrease in brightness output. However, this leaves the remaining voltage of approximately 150-152.5 peak volts of the A.C. supply of approximately 170 peak volts to be dropped across the remaining 25 shunts. This will result in a reversed bias of approximately 6.0-6.1 peak volts to be applied across each bulb during the said first half cycle of the A.C. operating potential, thereby resulting in a momentary tendency of the bulbs placed in particular corresponding sockets to increase in brightness output. During the next half cycle of the A.C. operating potential, the respective biasing condition is reversed, i.e., those bulbs receiving a forward bias of approximately 0.7-0.8 peak volts during the first half cycle will next receive a reverse bias of approximately 6.0-6.1 peak volts during the second half cycle, and vice versa for the remaining bulbs in the string.

Consequently, the average voltage dropped across each bulb during one complete positive and negative alternating cycle is approximately 3.4 peak volts, or 6.8 volts peak-to-peak which corresponds to the rating of the particular bulbs used in the series string. This is because, while the peak voltage in both cases are the same, the effective voltages are not. In the normal case, the wave form is sinusoidal, while in the Zener diode shunt case, the alternating wave form is one-half sine wave and one-half square wave. The half that is sine wave is approximately 6.2 volts (peak), while the remaining half is square wave, is approximately 0.7 volts (peak). The result is a difference in rms values but not in peak values. Therefore, the peak voltages are substantially the same but the rms voltages are not substantially the same. Such operation will result in a shortened bulb life, unless the incoming A. C. operating voltage is lowered or, alternatively, more bulbs are added to the series string. Theoretically, in order to operate at the conventional A.C. supply voltage of approximately 120 rms volts, which corresponds to approximately 170 peak volts, approximately one-third more bulbs should be added to the string in order for all bulbs in the string to be illuminated at a normal brightness level. With 50 bulbs rated at 2.4-2.5 volts, 170 milliamperes, are used in such a string, the string operates at a higher brightness level than normal. Adding more bulbs to the string or using lower current or higher voltage rated bulbs will bring the brightness down to more normal brightness levels. The number of bulbs in the string and/or the voltage and current rating of said bulbs can be adjusted to obtain the desired brightness level of the light string.

In operation, when but a single bulb becomes inoperative for any of the various reasons previously stated, except for internal shorting, there is a voltage drop across its corresponding Zener diode shunt of approximately 0.7-0.8 peak volts in the forward direction and approximately 6.2 peak volts in the reverse, or Zener direction, when 6.2 volt Zener diodes are chosen for shunts. Thus, in one complete cycle of the applied operating potential, the absolute value of the voltage across that particular bulb socket sequentially increases from approximately 0 volts, to approximately 6.2 peak volts, to approximately 0.7-0.8 peak volts, then back to approximately 0 volts, thereby averaging approximately 2.44 rms volts, substantially the same as the bulb rating. In fact, in a laboratory test, it was found that it was possible to remove 49 bulbs from a 50 bulb string and the sole remaining bulb continued to be illuminated, but with an estimated decrease in brightness of only approximately 50%.

In strings other than 50 bulbs wired in electrical series, it is only necessary to select the appropriate Zener diode rating to be used as shunts, and then electrically connect one-half in one direction and the remaining one-half in the opposite direction without regard and to which shunt, or series of shunts, is connected in a particular direction, so long as the overall relationship exists as described above. For example, it may be desirable from a manufacturing standpoint to merely alternate the shunt polarities. Further, for an odd number of bulbs in a string, such as a thirty-five bulb string for example, the polarities could be divided into two groups with 17 in one group and 18 in the remaining group.

Effective utilization of this new and novel "flip-flop" type of power distribution allows the practical use of but a single Zener diode as the only switching element, rather than two back-to-back Zeners as in FIG. 1, or a bilateral silicon switch as in FIG. 2, still further lowering the manufacturing cost of the overall string which is extremely competitive in today's marketplace from a cost standpoint, and for the very first time makes it commercially practical to utilize only a single Zener diode as previously attempted by the Sanders, et al, '079 patent. From strictly a manufacturing cost standpoint, it is estimated that a single Zener diode would cost approximately 2.0 cents in mass quantities, that the cost of back-to-back Zener diodes would be approximately 2.3 cents each, and that the cost of the HS-10 bilateral silicon switch would be approximately 5.0 cents.

In summary, with either "back-to-back" Zener diodes or "half-and-half" single Zener diodes being used as filament shunts, there is but a very slight reduction in voltage thereafter applied across each of the remaining bulbs in the series string when a bulb becomes inoperative as a result of one of the various reasons previously set forth, whereas, when the bilateral silicon switch is used as the filament switch, there may is slight increase in voltage applied across each of the remaining bulbs in the series string when a bulb becomes inoperative for any of the reasons aforesaid. This being the case, substantially all of the bulbs can be inoperative before the entire string immediately burns out.

Various other similar types of voltage sensitive switches shown in Radio Shack Semiconductor Reference Guide, Archer Catalog #276-405 (1992) having similar characteristics as those mentioned above may be used with equal or substantially equal success, the actual choice being determined by the cost of the device and the type of use or operation intended.

Figure 7:
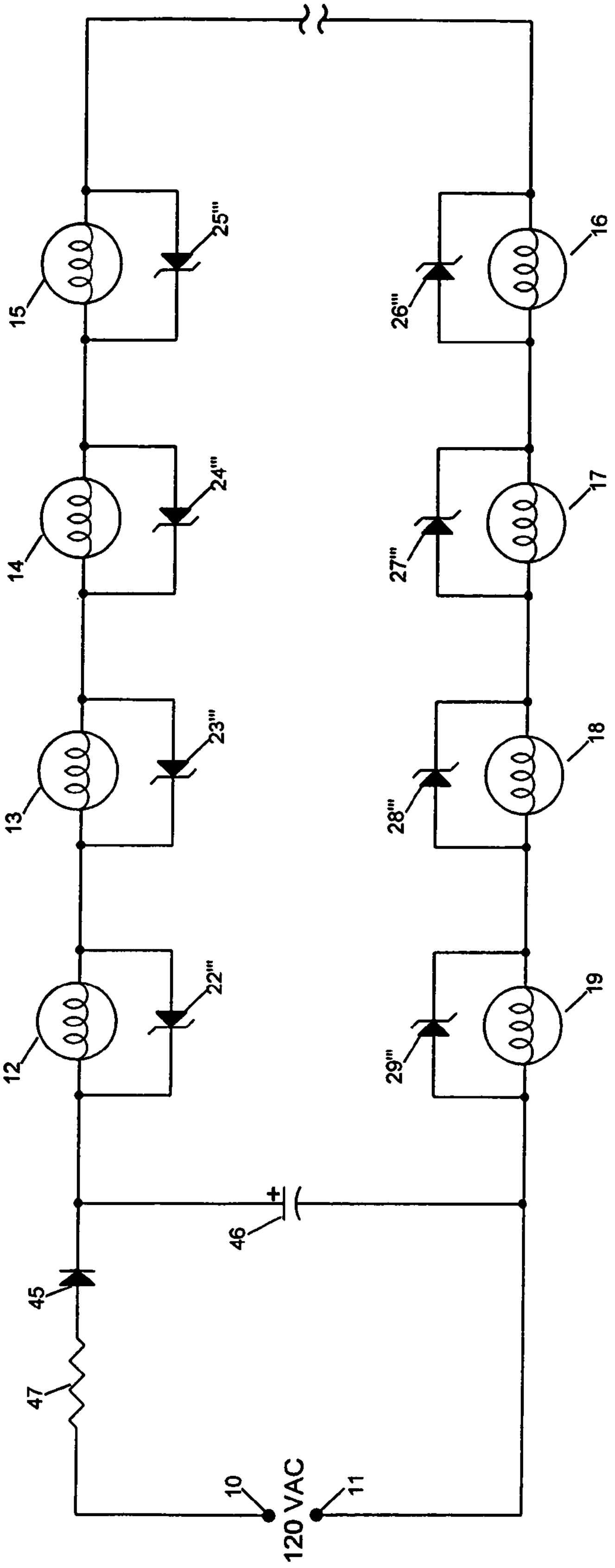
FIG. 7 is an electrical schematic diagram of a novel light string constructed in accordance with yet another embodiment of the present invention.

FIG. 7 shows an embodiment of the invention that is particularly suited for use in a light string of miniature light bulbs ("mini-lights"), which are preferably 2.5 volt, 170 milliampere bulbs. A single Zener diode 22''' to 29''' is connected across each light filament. The standard 120 volt AC household current applied across terminal 10, 11 is rectified using a single silicon rectifier diode 45 such as a 1N4004F rectifier and an electrolytic capacitor 46 is provided to partially filter the half-wave rectifier voltage. A resistor or thermistor 47 is preferably used in series with the rectifier diode 45 to limit current to the diode when first applying voltage. The value of the resistor should be low, such as approximately 20 ohms, or about the same average value if a thermistor is used.

Figure 8:
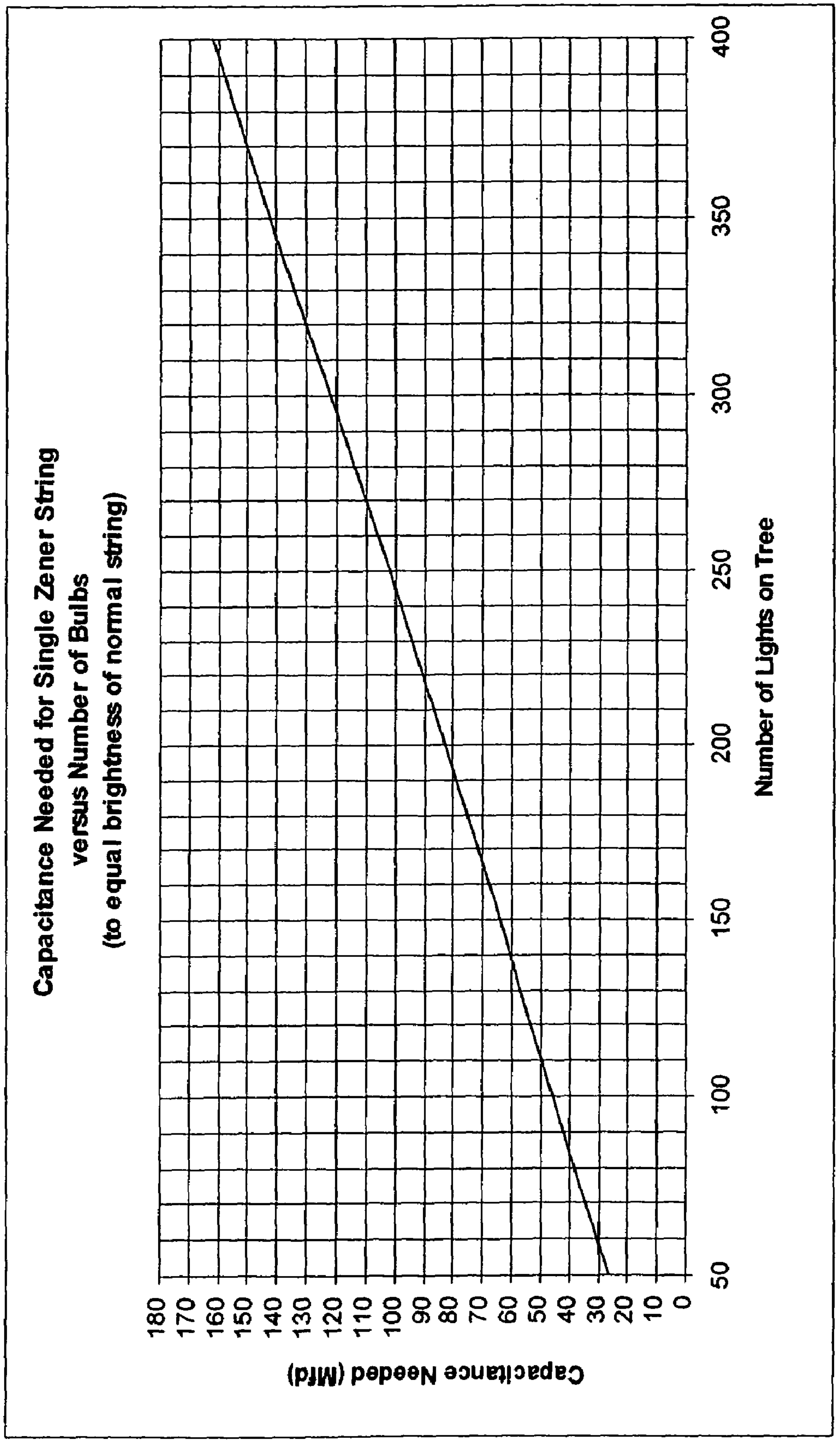
FIG. 8 is a graph showing the capacitance needed for the light string circuit of FIG. 7 versus the number of bulbs to maintain the brightness equal to that of a normal string.

FIG. 8 illustrates the effect of a 50 light string (with 170 milliampere bulbs) average brightness versus filter capacitance. With the standard 120 volt AC house current applied to the light string, with no Zener diode shunts, the string brightness (at a set distance away) averages 240 lumens. With a single 1N4004F silicon diode rectifier 45 in series with the 120 volt AC line, the average brightness is 61 lumens. If a small capacitance of only 3.3 microfarads is used to partially filter this half-wave rectified voltage, the average brightness is now 68 lumens. With a 10 microfarad capacitor, the average brightness jumps up to 119 lumens. The larger filter capacitance used, the brighter the light string.

Figure 9:
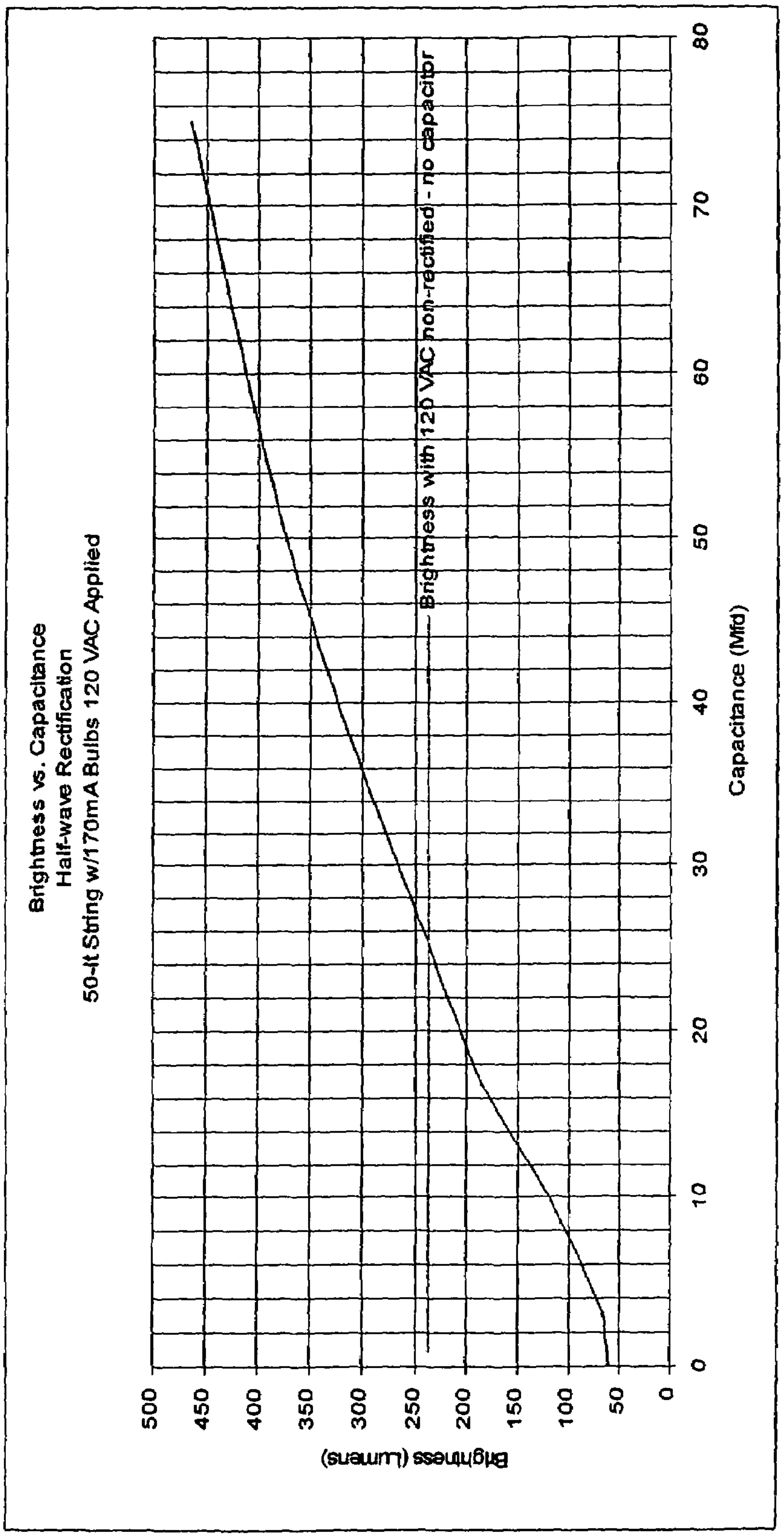
FIG. 9 is a graph of brightness versus capacitance for the 50 bulb light string circuit of FIG. 7.

FIG. 9 is a graph of brightness versus capacitance for a 50 bulb light string. With a 75 microfarad filter capacitor, the light string average brightness is 465 lumens. Using a low cost filter capacitance of approximately 33 microfarads and single Zener diodes as filament shunts 22''' to 29''', such as a 1N4729A Zener diode (having a half watt, 3.6 volts rating), a bright light string is provided.

Figure 10:
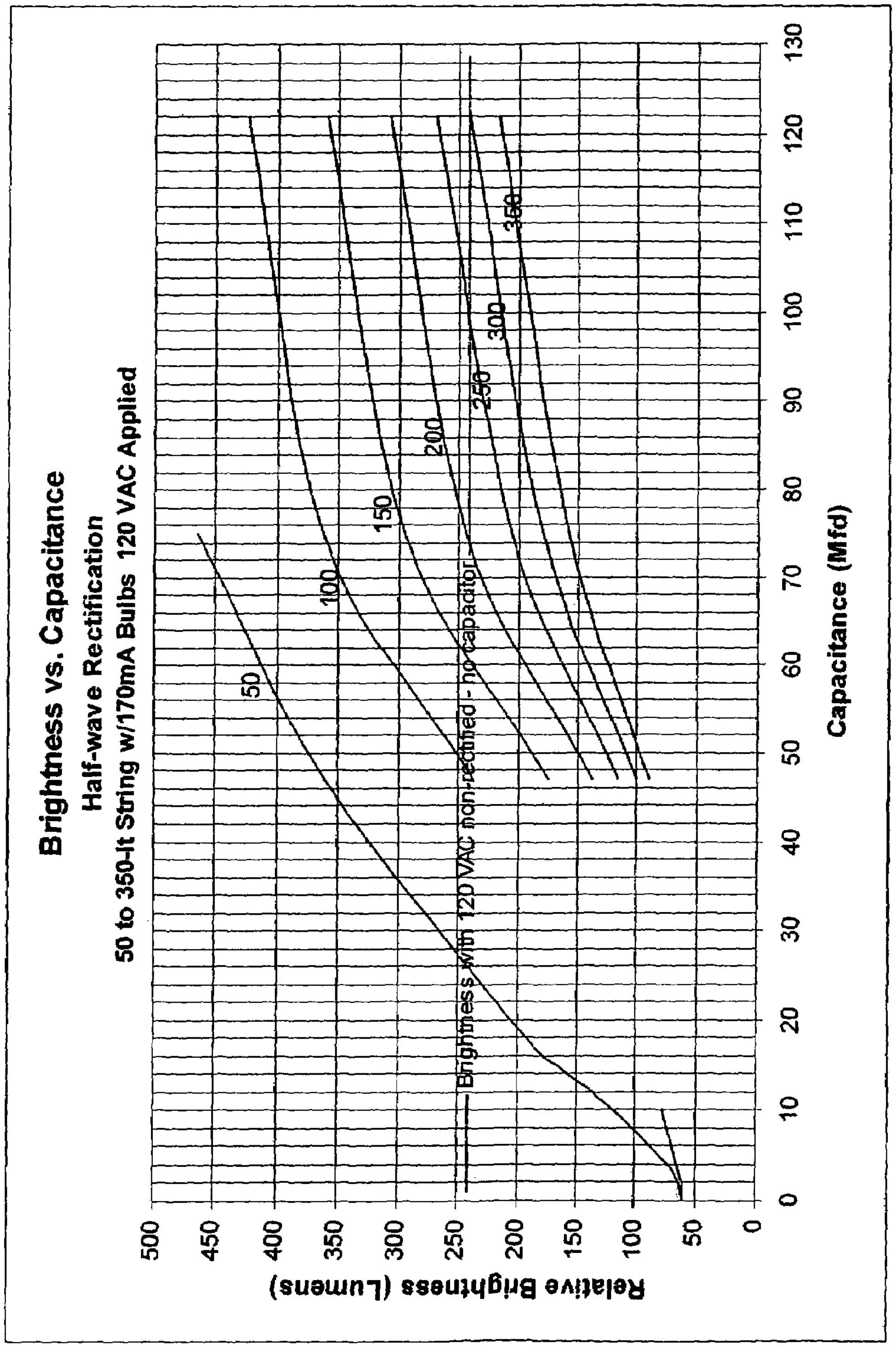
FIG. 10 is a collection of brightness versus capacitance graphs for multiple light string circuits of FIG. 7, consisting of up to 350 light strings, which are configured as a plurality of 50-light strings connected in parallel.

FIG. 10 is a collection of brightness versus capacitance graphs for multiple light string circuits of FIG. 7, consisting of up to 350 light strings, which are configured as a plurality of 50-light strings connected in parallel. Thus, a 100 light string consists of two 50-light strings in parallel, a 150 light string consists of three 50-light strings in parallel, etc. As shown in FIG. 10, by employing the circuit of FIG. 7 with an appropriate capacitance for the desired brightness, a single power supply unit can be used for multiple light strings such as used on a Christmas tree.

Having so described and illustrated the principles of my invention in a preferred embodiment, it is intended, therefore, in the annexed claims, to cover all such changes and modifications as may fall within the scope and spirit of the following claims. For example, it should be quite obvious to one skilled in the art that other similar devices could be used with equal success and that different Zener voltage ratings would be used for different lamps or bulbs.

What is claimed as new and desired to be protected by letters patent of the United States is:

1. A series-wired incandescent miniature light string, comprising:

at least 20 miniature light bulbs wired in electrical series connection;

at least one silicon diode in series with said series-wired miniature light bulbs for half-wave rectification of standard house current, and a current limiting resistor in series with the silicon diode;

at least one Zener diode respectively connected across each of said miniature light bulbs in said miniature light string, said Zener diode acting as a shunt to the respective miniature light bulb across which it is connected so that, if the respective miniature light bulb is missing or becomes inoperative, current will continue to flow through the series-wire light string and the remaining miniature light bulbs in the light string will remain lit; and an electrolytic filter capacitor between 5 and 100 microfarads coupled across said light string for filtering the half-wave rectifier voltage output from the silicon rectifier diode.

2. The light string of claim 1, comprising 50 miniature electrical light bulbs.

* * * * *